United States Patent
Knight et al.

(10) Patent No.: US 6,889,922 B1
(45) Date of Patent: May 10, 2005

(54) AGRICULTURAL IRRIGATION LINE HAVING DC MOTOR DRIVE SYSTEM

(76) Inventors: Ronald L. Knight, 1231 Kellems La., Etna, CA (US) 96027; David L. Krell, P.O. Box 174, Greenview, CA (US) 96037

( * ) Notice: Subject to any disclaimer, the term of this patent is extended or adjusted under 35 U.S.C. 154(b) by 599 days.

(21) Appl. No.: 08/821,995

(22) Filed: Mar. 22, 1997

(51) Int. Cl.[7] .................................................. B05B 3/00
(52) U.S. Cl. ........................ 239/737; 239/741; 239/744
(58) Field of Search .................................. 239/741, 737, 239/744

(56) References Cited

U.S. PATENT DOCUMENTS

| | | | |
|---|---|---|---|
| 3,929,197 A | * 12/1975 | Malott et al. | ................. 239/737 |
| 3,984,052 A | * 10/1976 | Di Palma | .................... 239/749 |
| 4,072,205 A | * 2/1978 | Batson | ........................ 239/741 |
| 4,146,049 A | 3/1979 | Kruse et al. | |
| 4,290,559 A | * 9/1981 | Mayer | ......................... 239/741 |
| 4,378,089 A | 3/1983 | Wilken et al. | |
| 4,411,386 A | 10/1983 | Disbrow | |
| 4,522,338 A | 6/1985 | Williams | |
| 4,626,984 A | * 12/1986 | Unruh et al. | .................. 239/69 |
| 4,632,494 A | 12/1986 | Newell et al. | |
| 5,246,164 A | 9/1993 | McCann et al. | |
| 5,390,858 A | * 2/1995 | Watson | ........................ 239/744 |

OTHER PUBLICATIONS

Anon., "Thunderbird Rolling Wheeline", 6 page undated brochure.

* cited by examiner

*Primary Examiner*—Steven J. Ganey

(57) ABSTRACT

A forward roll agricultural irrigation line includes an irrigation unit having a plenum pipe, a plurality of water delivery orifices in the plenum pipe, a water supply line in communication with the plenum pipe, and at least one drive wheel supporting the plenum pipe. Typically, there are a plurality of drive wheels supporting the plenum pipe. A drive unit includes a DC electrical motor mounted to the irrigation unit and engaged to controllably rotate the drive wheels, preferably by rotating the plenum pipe. A control/power unit includes a battery power supply, a control unit having as an input power from the battery power supply and as an output a control and power signal to the DC motor, and a photovoltaic battery charger providing recharging power to the battery power supply.

2 Claims, 3 Drawing Sheets

AGRICULTURAL IRRIGATION LINE HAVING DC MOTOR DRIVE SYSTEM

BACKGROUND OF THE INVENTION

This invention relates to irrigation, and, more particularly, to agricultural irrigation using a movable forward roll wheel line.

Agricultural irrigation is used to ensure a proper water supply to crops which would otherwise receive insufficient water. Water is, in some cases, supplied by flooding or trenches in the ground, and, in other cases, supplied by mechanized irrigation systems. There are numerous types of mechanized agricultural irrigation systems, and one of these, the wheel line and preferably the forward roll wheel line, is the field of application of the present invention.

In a typical forward roll wheel line, a plenum pipe having orifices therein is supported from a number of drive wheels. The plenum pipe is straight and typically from ⅛ to ¼ mile long. A gasoline engine is connected through a gear box to the plenum pipe, which serves as a drive shaft to wheels spaced apart along the plenum pipe. The gasoline engine is operated to turn the plenum pipe and the drive wheels, so that the irrigation source is moved laterally from station-to-station across a field. One end of the plenum pipe is connected to a water source, and irrigation is commenced. After a sufficient period of irrigation, the moving process is repeated. In each move, the plenum pipe is translated a distance such that complete irrigation coverage of the field is achieved after a series of moves. After irrigation at each station is complete, the operator turns off the water source, allows the water to drain from the plenum pipe and the wheel line, disconnects the water source from the wheel line, moves the forward roll wheel line to the next irrigation station, connects the water source, and begins irrigation at that station.

The forward roll wheel line is not to be confused with the linear irrigation line and the center-pivot irrigation line. The linear irrigation line moves linearly but continuously across a field. The center-pivot irrigation line rotates continuously about a center pivot. In each case the movement is continuous, rather than discontinuous as in the case of the forward roll wheel line. Both the linear irrigation line and the center-pivot irrigation line are full of water while moving. Consequently, each requires a much larger drive and support structure than the forward roll wheel line, and each is typically 3–4 times as expensive as the forward roll wheel line. The present invention may be used with linear and center pivot irrigation lines, but it is far less economically advantageous when used with these other line systems.

While the forward roll wheel line is operable and widely used, the inventors have recognized that existing forward roll wheel lines have some significant drawbacks. They may cause substantial environmental pollution and may be dangerous. They require substantial operator attention. There is, accordingly, a need for an improved agricultural forward roll wheel line. The present invention fulfills this need, and further provides related advantages.

SUMMARY OF THE INVENTION

The present invention provides an improved forward roll wheel line that is fully operable to provide agricultural irrigation. The forward roll wheel line of the invention has reduced noise, air pollution, and ground-water pollution as compared with conventional forward roll wheel lines. Additionally, the operating cost is substantially reduced.

In accordance with the invention, an agricultural irrigation line comprises an irrigation unit having a plenum pipe, a plurality of water delivery orifices in the plenum pipe, a water supply line in communication with the plenum pipe, and at least one, and typically a plurality of, drive wheels supporting the plenum pipe. The water supply line is preferably located at one of the ends of the plenum pipe. The wheel line also includes a drive unit having a DC electrical motor mounted to the irrigation unit and engaged to controllably rotate the at least one drive wheel. Connection between the DC electrical motor, which is preferably a low-voltage 12–24 volt motor, and the drive wheel is preferably accomplished by a hydraulic pump driven by the DC electrical motor, a hydraulic motor receiving fluid pressure from the hydraulic pump, and a gearbox. A control/power unit includes a battery power supply, a control unit having as an input power from the battery power supply and as an output a control signal to the DC motor, and a photovoltaic battery charger providing recharging power to the battery power supply.

The driving of the drive wheel(s) by a DC electrical motor permits the unit to be operated entirely from solar power, using the photovoltaic battery charger, in most conditions. The preferred low-voltage DC electrical motor is safe and does not subject those working around the irrigation line to the risk of shocks even in wet weather. The noise and pollution associated with gasoline motors is eliminated. Additionally, the system can be operated using a remote control unit and, where desired, controlled by a remote computer. Labor costs and thence the irrigation costs are substantially reduced, while errors resulting from human inattention are also reduced.

The present invention thus provides an efficient approach to agricultural irrigation that has reduced adverse environmental impacts and reduced operating costs. It is most preferably applied to a forward roll irrigation wheel line, but may be used with a linear irrigation line or a center-pivot irrigation line as well. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
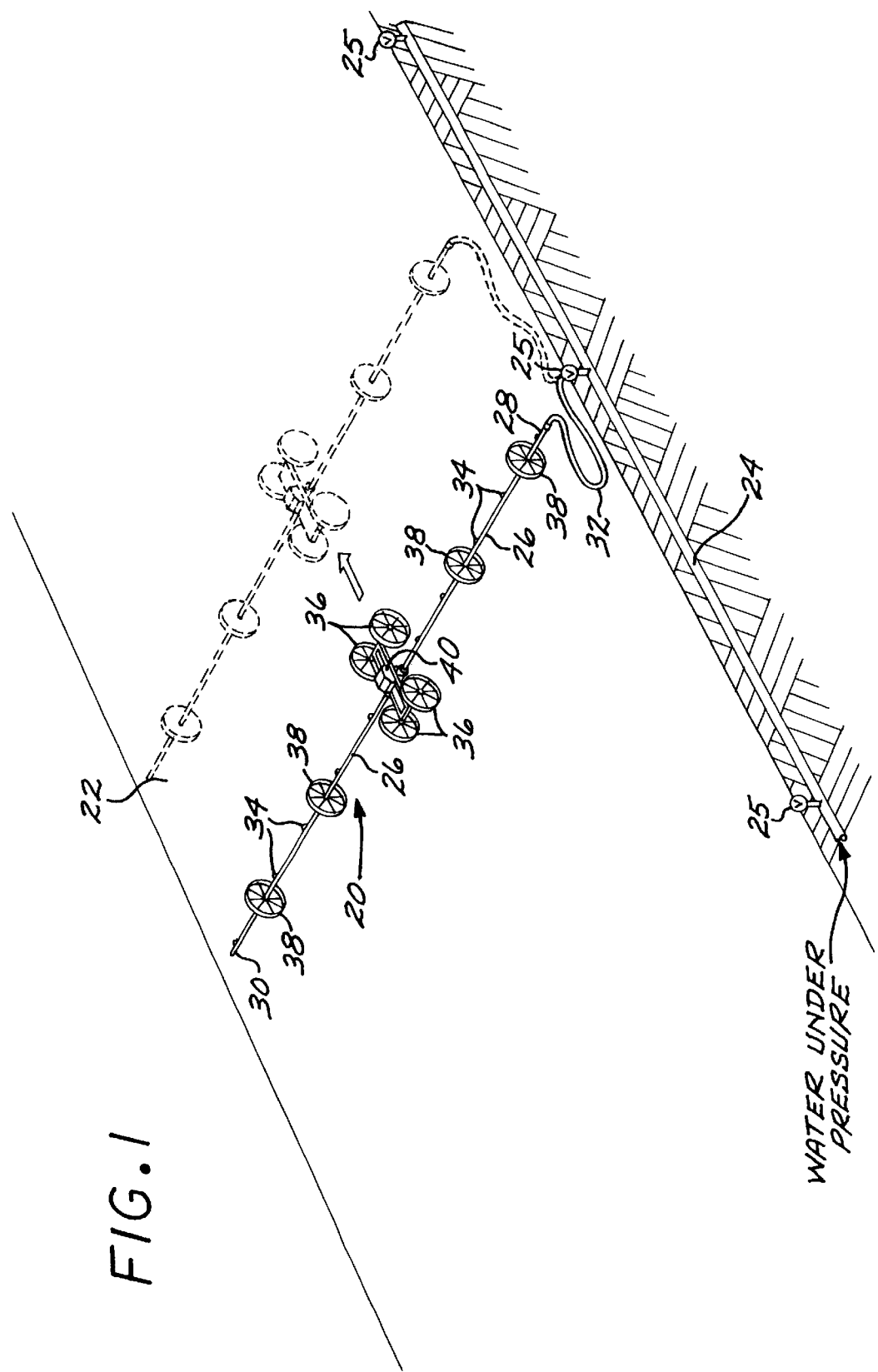
FIG. 1 is a schematic perspective view of a forward roll agricultural irrigation wheel line in operation.

FIG. 1 depicts a forward roll agricultural irrigation wheel line 20, the preferred application of the invention, operating in a field 22. A pressurized supply pipe 24 with periodic risers and connector valves 25 extends down one side of the field.

The wheel line 20 includes a generally straight plenum pipe 26 extending across the field 22. The plenum pipe 26 has a first end 28 and a second end 30. One end of a water supply line 32 at the first end 28 is in communication with the plenum pipe 26, and the other end is in communication with one of the valves 25 in the supply pipe 24 A plurality of water delivery orifices 34 are disposed along the length of the plenum pipe 26. Preferably, the orifices 34 have attached water distribution devices such as stationary sprinklers or impact drive sprinklers, to provide an even distribution of water flowing from the orifices 34.

The plenum pipe 26 is supported for rolling motion along its length by at least one powered drive wheel 36 and, preferably, a plurality of drive wheels 36 and 38. The drive wheels 36 are desirably located at approximately the midpoint of the plenum pipe 26, mounted to a driver frame 40 midway between its ends 28 and 30. The wheels 38 are located remotely from the driver frame 40, at intervals along the length of the plenum pipe 26. The drawing of FIG. 1 illustrates only a few of the wheels 38. In practice, the plenum pipe 26 is typically from about ⅛ to ¼ mile long, with wheels 36 and 38 having a diameter of about 5–7 feet. The wheels 38 are typically spaced about 40 feet apart along the length of the plenum pipe 26.

In operation, the wheel line 20 is positioned at a first station, as illustrated in FIG. 1. One end of the supply line 32 is coupled to the first end 28 of the plenum pipe 26 and the other end is placed in communication with the water in the water supply pipe 24 or other source of water. Water flows from the pressurized supply pipe 24, through the plenum pipe 26, and out the orifices 34 to irrigate the strip of land on either side of the plenum pipe 26. When irrigation of that strip is complete the water flow through the plenum pipe 26 is discontinued, the supply line 32 is disconnected, and the water in the plenum pipe 26 is allowed to drain out. The drive wheels 36 and 38 are turned to move the plenum pipe 26 and thence the wheel line 20 across the field to the next irrigation station, indicated in phantom lines in FIG. 1. The irrigation process as described above is thereafter repeated. These discontinuous, intermittent steps are repeated at intervals to traverse the wheel line 20 down the field 22, so that the entire field is irrigated by the time that the wheel line 20 has traversed the length of the field.

Figure 2:
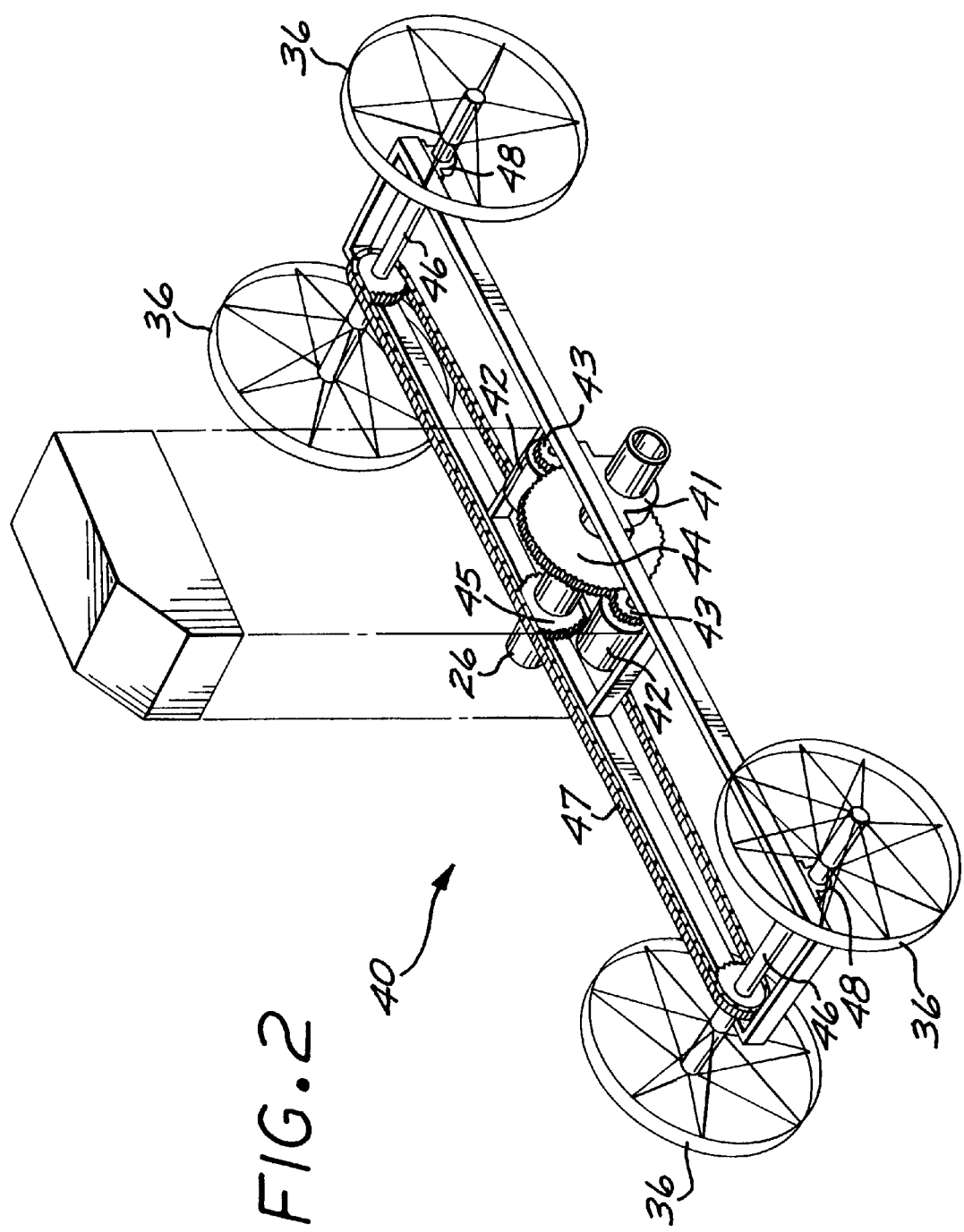
FIG. 2 is a perspective view of a preferred drive unit, with some components removed for clarity of illustration.

FIG. 2 illustrates in greater detail the driving mechanism for the wheel line 20. The generally rectangular driver frame 40 is supported at its four corners by the wheels 36. The plenum pipe 26 is supported from the driver frame 40 at about the end-to-end midpoint of the plenum pipe 26 by bearings 41. At least one, and preferably two, drive motor systems 42 are supported on the driver frame 40. Each drive motor system 42 is connected to the plenum pipe 26 thorough a gear 43 fixed to the rotational output of the drive motor system 42 and a gear 44 fixed to the plenum pipe 26.

A sprocket 45 fixed to the plenum pipe 26 drives axles 46 to which the drive wheels 36 are mounted, through a chain (or belt) 47. The drive wheels 36 are fixedly mounted to the axles 46, and the axles 46 are supported from the underside of the driver frame 40 by bearings 48. The drive wheels 38 (FIG. 1) are fixedly attached to the plenum pipe 26 and rotate with it as it turns. The wheel line 20 is translated across the field 22 by rotationally driving the plenum pipe 26 with the drive motor system(s) 42, thereby rotating the wheels 36 and 38. The plenum pipe 26 thus acts as a ⅛–¼ mile long drive shaft from the drive motor system(s) 42 to the wheels 36 and 38.

Figure 3:
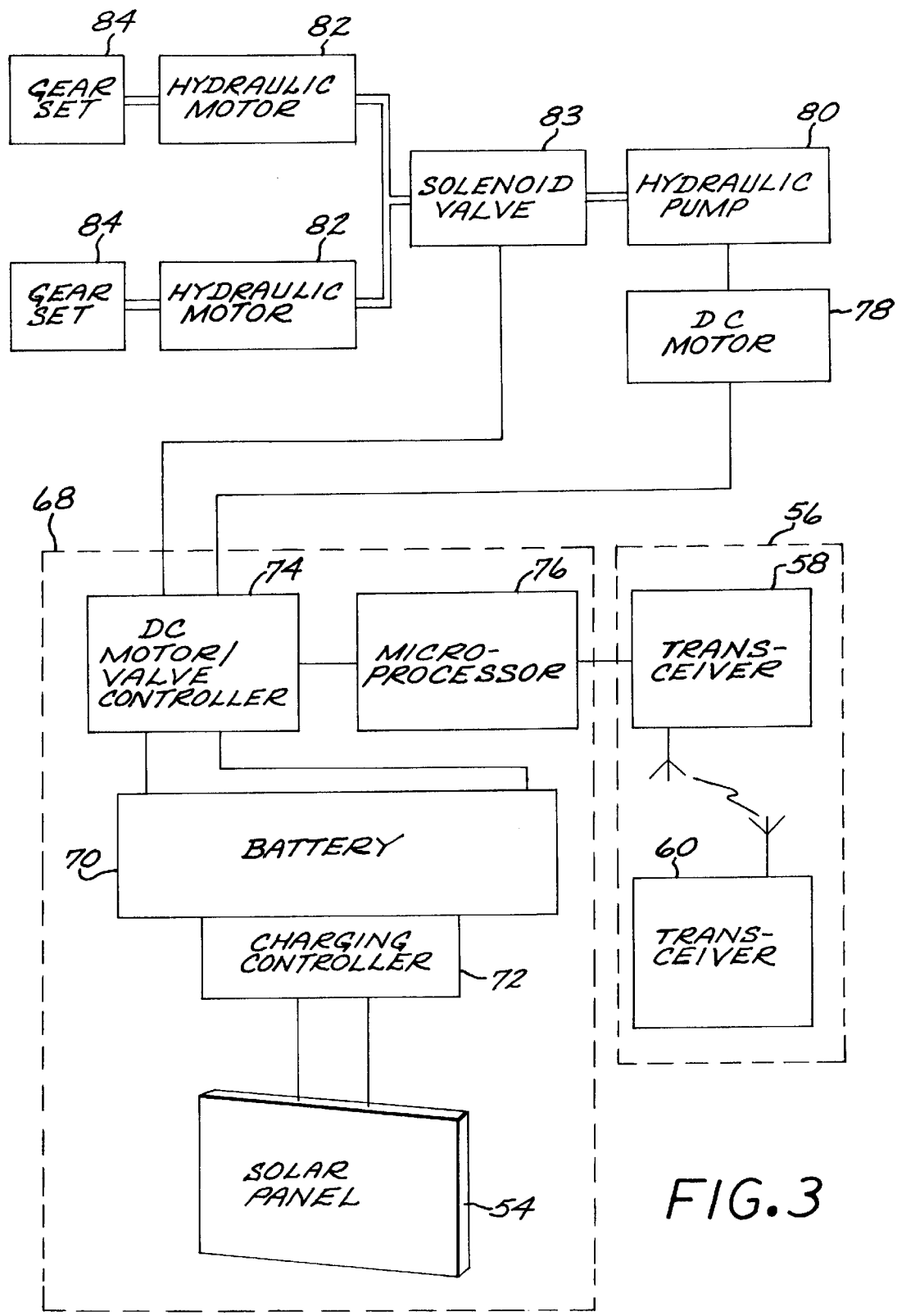
FIG. 3 is a diagrammatic illustration of the drive and control components of the forward roll agricultural irrigation wheel line.

FIG. 3 illustrates the drive and control components of the drive motor system 42 of the wheel line 20 in greater detail. As will be described in more detail subsequently, the motive power for the wheel line 20 is electrical power generated by solar energy. A photovoltaic cell 54 is supported on the driver frame 40 and electrically connected to the remainder of the drive motor systems 42. The present wheel line 20 is readily controlled at the control/power unit or remotely. To implement the latter, a remote control unit 56, including a first transceiver unit 58 on the driver frame 40 and a second transceiver unit 60 located elsewhere, is provided. The first transceiver unit 58 is in electrical communication with the driver motor system(s) 42, to provide control instructions or data output.

The drive motor system 42 includes a control/power unit 68 having a battery 70 that is charged by the photovoltaic cell 54 through a charging controller 72. The output of the battery 70 is supplied to a DC motor/valve controller 74. The functioning of the DC motor/valve controller 74 is controlled by programmable microprocessor 76 or other programmable controller.

Instructions to the microprocessor 76 and reports of system performance may be communicated through the remote control unit 56. The first transceiver 58 is carried onboard the driver frame 40 and is in hard-wired electrical communication with the microprocessor 76. The second transceiver 60 is remotely located and is in radio contact with the first transceiver 58. A remotely located person or master control computer may control the microprocessor 76 through this radio link, and may be informed of the status of the wheel line 20.

One controllable output of the DC motor/valve controller 74 is supplied as a control and power signal through a cable to a DC electrical motor 78 within the drive unit 50. The DC electrical motor 78 supplies power to a hydraulic pump 80. The hydraulic pump 80 drives a hydraulic motor 82, through a solenoid valve 83. The solenoid valve 83 is operated by a second output of the DC motor/valve controller 74. The solenoid valve 83 allows the controllable reversing of the hydraulic motor 82, so that the wheel line 20 may be driven across the field in either direction. The output of the hydraulic motor 82 is supplied to a gear set 84, which in the preferred embodiment is the gears 43 and 44. The gear set 84 reduces the output of the hydraulic motor 82 to a low turning rate, high torque output that is provided to the plenum pipe 26 and thence to the wheels 36 and 38.

Where there are multiple drive motor systems 42, these elements may be arranged as desired. In the preferred approach, there is a single control/power unit 68, a single DC motor 78, a single hydraulic pump 80, a single solenoid valve 83. These supply motive force to two hydraulic motors 82 and two gear sets 84. Other equivalent approaches may also be used based upon the system described herein.

A working prototype of the present invention has been built and tested by the inventors. A Western Irrigation forward roll wheel line was used. The gasoline motor was removed and a permanent magnet, 1–½ horsepower DC electric motor 78, manufactured by Ohio Electric, rated at 24 volts and 2700 rpm was installed. The solenoid 83 was a Compact Controls CP530-3P. The hydraulic motor 82 was a Char-Lynn H-series motor. Two 12-volt lead acid, deep-cycle Johnson Controls batteries 70, each rated at 115 ampere-hours, were connected in series to provide the 24-volt power for the motor. The solar panel 24 was a 55 watt, 12-volt model manufactured by Solec. The charging controller 72 included a 12 volt-to 24 volt DC to DC converter. The microprocessor 76 was a Microchip Technology PIC16C54. For the prototype in which communication was made only to (and not from) the wheel line 20, the transceiver 58 was a Linear Corporation Model DXR-701 receiver, and the transceiver 60 was a Linear Corporation Model DXT-25 transmitter. The prototype wheel line was successfully operated by the inventors to irrigate a field 22.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An agricultural irrigation line, comprising:
   an irrigation unit, comprising
      a plenum pipe,
      a plurality of water delivery orifices in the plenum pipe,
      a water supply line in communication with the plenum pipe, and
      at least one drive wheel supporting the plenum pipe,
   a drive unit comprising
      a DC electrical motor mounted to the irrigation unit and operable to controllably rotate the at least one drive wheel and the plenum pipe, wherein the DC electrical motor is operable with a maximum drive voltage of from about 12 to about 24 volts;
   a control/power unit, comprising,
      a battery power supply,
      a control unit having
         as an input power from the battery power supply, and
         as an output a control and power signal to the DC electrical motor, and
      a photovoltaic battery charger providing recharging power to the battery power supply.

2. An agricultural irrigation line, comprising:
   a plenum pipe having a first end and a second end;
   a plurality of water delivery orifices in the plenum pipe;
   a water supply line coupling in communication with the plenum pipe at the first end thereof;
   at least one drive wheel engaged to and supporting the plenum pipe;
   a DC electrical motor mounted to the irrigation unit and operable to controllably rotate the plenum pipe, wherein the DC electrical motor is operable with a maximum drive voltage of from about 12 to about 24 volts;
   a battery power supply;
   a control unit having as an input power from the battery power supply, and as an output a control and power signal to the DC electrical motor; and
   a photovoltaic battery charger providing recharging power to the battery power supply.

\* \* \* \* \*